United States Patent
Nguyen et al.

(10) Patent No.: US 7,590,706 B2
(45) Date of Patent: Sep. 15, 2009

(54) METHOD FOR COMMUNICATING IN A COMPUTING SYSTEM

(75) Inventors: Lu Nguyen, San Jose, CA (US); Steven D. Cook, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 10/862,173

(22) Filed: Jun. 4, 2004

(65) Prior Publication Data

US 2005/0271061 A1    Dec. 8, 2005

(51) Int. Cl.
    *G06F 15/16*    (2006.01)
(52) U.S. Cl. ........................... 709/217; 709/219
(58) Field of Classification Search ............... 709/217, 709/219
    See application file for complete search history.

(56) References Cited

U.S. PATENT DOCUMENTS

| | | | |
|---|---|---|---|
| 5,812,748 A | 9/1998 | Ohran et al. | |
| 5,909,540 A | 6/1999 | Carter et al. | |
| 6,108,300 A | 8/2000 | Coile et al. | |
| 6,145,066 A | 11/2000 | Atkin | |
| 6,148,383 A * | 11/2000 | Micka et al. | 711/162 |
| 6,176,733 B1 | 1/2001 | Coile et al. | |
| 6,301,643 B1 * | 10/2001 | Crockett et al. | 711/162 |
| 6,370,583 B1 | 4/2002 | Fishler et al. | |
| 6,397,307 B2 | 5/2002 | Ohran | |
| 6,484,187 B1 * | 11/2002 | Kern et al. | 707/204 |
| 6,658,590 B1 * | 12/2003 | Sicola et al. | 714/6 |
| 6,912,629 B1 * | 6/2005 | West et al. | 711/161 |
| 2002/0016827 A1 | 2/2002 | McCabe et al. | |
| 2002/0103980 A1 * | 8/2002 | Crockett et al. | 711/162 |
| 2003/0002492 A1 * | 1/2003 | Gallagher et al. | 370/360 |
| 2003/0046369 A1 | 3/2003 | Sim et al. | |
| 2003/0115357 A1 * | 6/2003 | Chu et al. | 709/237 |
| 2004/0034808 A1 * | 2/2004 | Day et al. | 714/6 |
| 2004/0081118 A1 * | 4/2004 | Mukherjee et al. | 370/328 |

OTHER PUBLICATIONS

Cook et al., U.S. Appl. No. 10/685,878, titled "Remote Activity Monitoring", filed Oct. 14, 2003.

* cited by examiner

*Primary Examiner*—John Follansbee
*Assistant Examiner*—Alan S Chou
(74) *Attorney, Agent, or Firm*—Konrad Raynes & Victor LLP

(57) ABSTRACT

One aspect of the invention is a method for communicating in a computing system. An example of the method includes establishing a local communications interface at a local site. This example also includes writing local site communication information to the local communications interface, which comprises storing the local site communication information on a first site storage device at the local site, and sending the local site communication information from the first site storage device, to a third site storage device at a remote site, wherein the local site communication information is sent using a remote data replication protocol. The remote site communications interface may read the local site communication information from a third site storage device, and may send the local site communication information to a remote application at the remote site. Similarly, the remote application may send information to a local application at the local site.

14 Claims, 6 Drawing Sheets

METHOD FOR COMMUNICATING IN A COMPUTING SYSTEM

BACKGROUND

1. Technical Field

The present invention relates to providing communications between computing devices. More particularly, some examples of the invention concern using one or more data replication communication links for general communications between computing devices.

2. Description of Related Art

Computing systems often include computing devices located at different sites. Computing devices at separate sites may communicate over one or more different types of networks. As an example, if a user has a primary datacenter and also has a backup datacenter (for disaster recovery or other purposes), the two datacenters typically are connected with a wide area network (WAN) for IP communications, and storage area network (SAN) for storage communications (for example for replicating data). As an example, IP network communications may be used for web browsers, email, databases, banking, and voice over IP.

With regard to backing up data, many business, government, and other types of computer users, update and store data at a primary datacenter site, and maintain a backup copy of the data, called a remote mirror, at a secondary datacenter site that is physically remote from the primary site. The primary site may be called a local site, and the secondary site may be called a remote site. Storing a backup copy of data at a remote site permits recovering data from the remote site in the event of an equipment failure or other disaster, for example a fire or explosion, which damages or destroys data at the local site. Copying data to a remote secondary site as a backup, for disaster recovery, is referred to as data replication, data shadowing, data mirroring, data duplexing, or remote copying.

The International Business Machines (IBM) Peer-to-Peer Remote Copy (PPRC) facility is an example of a synchronous remote data replication system. With PPRC, when a data update is written from an application running on a host at a local site, to a storage device at the local site, a storage controller at the local site stores the update on the storage device at the local site, and also forwards the update to a storage controller at a remote site for storage on a storage device at the remote site.

A SAN used for backing up data to a remote site, or a WAN used for IP communications between sites, may fail. If the WAN fails, IP communications between the sites will not be possible. The IP communications will be nonfunctional even if the SAN is functioning normally. Users have attempted to avoid the loss of IP communications and/or storage communications, by employing redundant IP networks and redundant storage area networks. However, setting up and maintaining backup networks is generally very costly. For example, in a typical disaster recovery system using redundant networks, the networks are the costliest part of the system, and generally amount to 60-80% of the cost, while hardware and software make up only 20-40% of the cost. Consequently, existing techniques for maintaining network availability are generally inadequate.

SUMMARY

One aspect of the invention is a method for communicating in a computing system. An example of the method includes establishing a local communications interface at a local site. This example also includes writing local site communication information to the local communications interface. Writing local site communication information to the local communications interface comprises storing the local site communication information on a first site storage device at the local site, and sending the local site communication information from the first site storage device at the local site, to a third site storage device at a remote site, wherein the local site communication information is sent from the first site storage device to the third site storage device using a remote data replication protocol. This example further includes receiving remote site communication information at the local communications interface at the local site.

Other aspects of the invention are described in the sections below, and include, for example, a computing system, and a signal bearing medium tangibly embodying a program of machine-readable instructions executable by a digital processing apparatus to perform operations for communicating in a computing system.

Some examples of the invention advantageously provide a robust and low cost technique for maintaining IP communications capabilities when a primary IP network fails, by using data replication communication link(s) for IP communications. Also, some examples of the invention provide improved utilization of existing communications links. Further, some examples of the invention beneficially operate seamlessly with existing software. Still further, some examples of the invention beneficially provide two-way communications utilizing one-directional remote data replication technology. The invention also provides a number of other advantages and benefits, which should be apparent from the following description.

DETAILED DESCRIPTION

Figure 1:
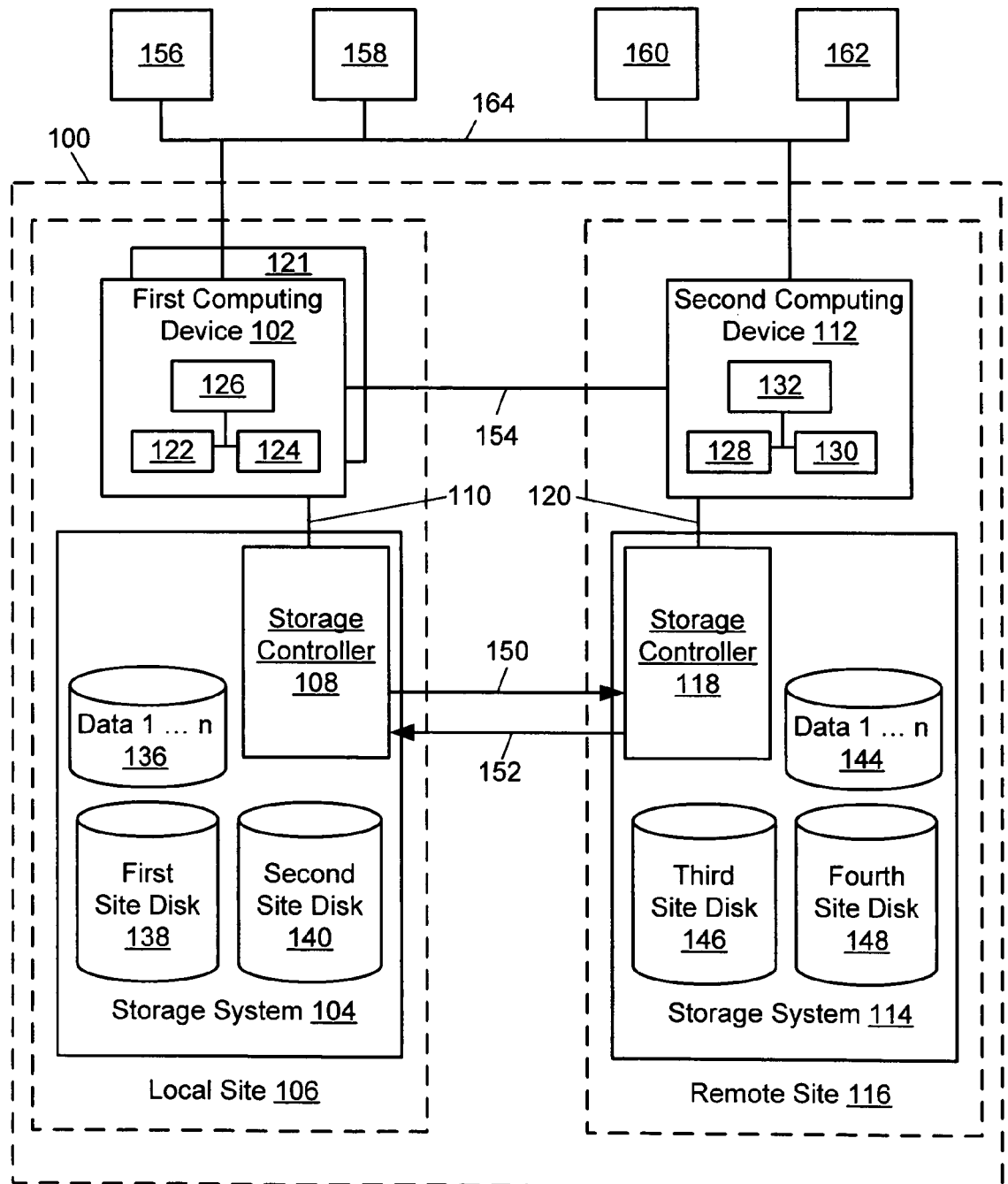
FIG. 1 is a block diagram of the hardware components and interconnections of a geographically dispersed computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system that provides communications between computing devices in the computing system. As an example, the computing system may be embodied by the hardware components and interconnections of the geographically dispersed computing system 100 shown in FIG. 1. In other examples of the invention, the computing system need not be geographically dispersed. The computing system 100 may be used, for example, for processing and storing data for banks, governments, large retailers, or medical care providers.

The computing system 100 may include a first computing device 102 (which may also be called a node), and a first storage system 104, which are located at a local site 106. The first computing device 102 is coupled to a first storage controller 108 in the first storage system 104 with link 110, which may be, for example, a FCP (Fibre Channel Protocol) link, or parallel SCSI links. Similarly, the computing system 100 may also include a second computing device 112, and a second storage system 114, which are located at a remote site 116. The second computing device 112 is coupled to a second storage controller 118 in the second storage system 114 with link 120, which may be, for example, a FCP link or parallel SCSI links. The words "local" and "remote" are used to distinguish between two sites. However, the designation of one of the sites as "local" and the designation of the other site as "remote" is arbitrary. In other words, the "local" site could be referred to as the "remote" site, and the "remote" site could be referred to as the "local" site. Additionally, the second computing device 112 may be called the peer computing device (or node) of the first computing device 102, and similarly, the first computing device 102 may be called the peer computing device of the second computing device 112. As an example, the local site 106 and the remote site 116 may be separated by a distance of 103 kilometers or more. Alternatively, the local site 106 and the remote site 116 may be much closer together, and, for example, could be in the same building, room, or equipment enclosure. The computing system 100 may be implemented, for example, utilizing the Microsoft Windows operating system (which is produced by Microsoft Corporation), or the IBM AIX operating system (which is produced by International Business Machines Corporation), and the PPRC function of Enterprise Storage Servers (ESS), which are manufactured by International Business Machines Corporation.

In some examples of the computing system 100, the local site 106 could have more than one computing device, and similarly, the remote site 116 could have more than one computing device. Generally, any number of computing devices could be included at each site 106, 116, and in one example, four computing devices could be included at each site 106, 116. In the example shown in FIG. 1, a third computing device 121, which would generally be coupled to other elements in the computing system 100 similarly to the first computing device 102, is shown at the local site 106.

The first computing device 102 may include a first memory 122, a first non-volatile storage 124, and a first processor 126. Similarly, the second computing device 112 may include a second memory 128, a second non-volatile storage 130, and a second processor 132. As an example, each of the processors 126, 132 may be an Intel processor. In some examples, each computing device 102, 112 could have more than one processor. The memories 122, 128 may, for example, be used to store data and application programs and/or other programming instructions executed by the processors 126, 132. As an example, the memories 122, 128 may be implemented with RAM. The non-volatile storage 124, 130 may be, for example, hard disk drives, or drives for reading and writing from optical or magneto-optical media, tape drives, or any other suitable type of storage. In some examples the memories 122, 128 or the non-volatile storages 124, 130 could be eliminated, or the memories 122, 128 and non-volatile storages 124, 130 could be provided on the processors 126, 132, or alternatively, external from the computing devices 102, 112.

Each computing device 102, 112 may be, for example, a switch (such as an Ethernet switch, an Internet Protocol switch, or other type of switch), a router, or a server. In some implementations where the computing devices 102, 112 are switches, or routers, the computing devices 102, 112 may route the communications over an Ethernet link or a Fibre Channel link, depending on availability and load, and in these implementations individual client computers need not have access to disks on the storage system(s). As an example, each computing device 102, 112 may be a Cisco Catalyst 4500 Series Switch, manufactured by Cisco Systems, Inc. As another example, each computing device 102, 112, may be a Cisco 7600 Series Router, manufactured by Cisco Systems, Inc. Alternatively, a server computer with routing software could also function as a router. As another example, each computing device 102, 112 may be an IBM xSeries server, manufactured by International Business Machines Corporation. Alternatively each computing device 102, 112 could be an IBM zSeries Parallel Sysplex server, such as a zSeries 900, running the z Operating System (z/OS). In another example, each computing device 102, 112 could be an IBM S/390 server running OS/390. Alternatively, each computing device 102, 112 could be implemented with a mainframe computer, a computer workstation, a personal computer, a supercomputer, or other suitable computing device. It is not necessary for each computing device 102, 112 to be implemented with the same type of computing device.

The first storage system 104 may include one or more first data disks 136, a first site disk 138 (also called a first primary site disk), and a second site disk 140 (also called a second secondary site disk), which are coupled to the first storage controller 108. Similarly, the second storage system 114 may include one or more second data disks 144, a third site disk 146 (also called a first secondary site disk), and a fourth site disk 148 (also called a second primary site disk), which are coupled to the second storage controller 118. Each disk 136, 138, 140, 144, 146, 148 could also be implemented as a volume. In one example, the first storage system 104 and the second storage system 114 are each a model 2105 Enterprise Storage Server, manufactured by International Business Machines Corporation. The first storage controller 108 may be coupled to the second storage controller 118 with a first Fibre Channel link 150, and a second Fibre Channel link 152, (which may be unidirectional, and which may also be called communications links or PPRC communications links or data replication communications links). Appropriate communications technology other than Fibre Channel, (for example ESCON (Enterprise Systems Connection)) could also be used for these links. Generally, examples of the invention may be implemented with unidirectional protocols, such as ESCON, and may also be implemented with bi-directional protocols, such as Fibre Channel Protocol (FCP). The logical PPRC paths 150 and 152 may each represent one or more physical paths. When referring to the data disks 136, 144, and site disks 138, 140, 146, 148, the word "disk" is intended to broadly cover any suitable type of storage device, using any suitable technology, such as magnetic, optical, magneto-optical, or electrical, and includes hard disk drives, optical disks or discs (for example, CD-RW, DVD-RW, or DVD+RW), floppy disks, magnetic data storage disks or diskettes, magnetic tape, digital optical tape, EPROMs, EEPROMs, RAM, Non-Volatile RAM, and flash memory.

The local site 106 and the remote site 116 are communicatively coupled with a communications link, which, for example, may be an Ethernet link. More specifically, the first computing device 102 may be coupled to the second computing device 112 with a primary communications link 154. Client computers 156, 158, 160, 162, which may be included in some alternative embodiments, may be coupled to the first computing device 102 and the second computing device 112 via a backup communications link 164, which may provide an alternate communications path between the first computing device 102 and the second computing device 112. The backup communications link 164 provides extra communications redundancy between the first computing device 102 and the second computing device 112, which probably is not needed when examples of the invention are utilized. As an example, each client computer 156, 158, 160, 162 may be a personal computer, and may run any suitable operating system, for example Windows, Linux, Unix, or an Apple operating system.

II. Operation

In addition to the hardware embodiments described above, other aspects of the invention concern a method for communicating in a computing system.

A. Signal-Bearing Media

In the context of FIG. 1, the method aspects of the invention may be implemented, for example, by having one or more of the computing devices 102, 112 execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform operations for communicating in a computing system.

Figure 2:
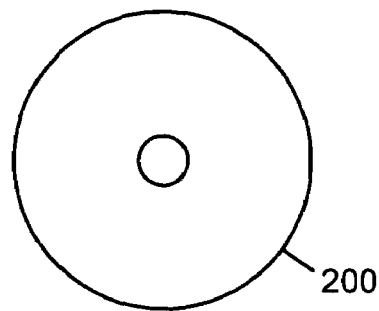
FIG. 2 is an example of a signal-bearing medium in accordance an example of the invention.

This signal-bearing medium may comprise, for example, first memory 122, first non-volatile storage 124, and/or first data disks 136. Alternatively or additionally, the signal-bearing medium may comprise, second memory 128, second non-volatile storage 130, and/or second data disks 144. Alternatively, the instructions may be embodied in a signal-bearing medium such as the optical data storage disc 200 shown in FIG. 2. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, or elsewhere, the instructions may be stored on any of a variety of machine-readable data storage mediums or media, which may include, for example, a "hard disk drive", a RAID array, a magnetic data storage diskette (such as a floppy disk), magnetic tape, digital optical tape, RAM, ROM, EPROM, EEPROM, flash memory, programmable logic, any other type of firmware, magneto-optical storage, paper punch cards, or any other suitable signal-bearing media including transmission media such as digital and/or analog communications links, which may be electrical, optical, and/or wireless. For example, in some embodiments the instructions or code may be accessible from a file server over a network, or from other transmission media, and the signal bearing media embodying the instructions or code may comprise a transmission media, such as a network transmission line, wireless transmission media, signals propagating through space, radio waves, and/or infrared signals. Alternatively, the signal bearing media may be implemented in hardware logic, for example, an integrated circuit chip, a Programmable Gate Array (PGA), or an Application Specific Integrated Circuit (ASIC). As an example, the machine-readable instructions may comprise software object code, compiled from a language such as "C++".

B. Overall Sequence of Operation

U.S. patent application Ser. No. 10/685,878, filed Oct. 14, 2003, titled "Remote Activity Monitoring", is incorporated herein by reference. One aspect of the invention disclosed in that application is a method for remotely monitoring activity. An example of that method may be summarized as follows: The method includes the operations of generating first server heartbeat information at a first server at a local site, and storing the first server heartbeat information in a first primary site disk at the local site. The method also includes sending the first server heartbeat information from the first primary site disk, to a first secondary site disk at a remote site. The method further includes receiving information from a second secondary site disk at the local site, and determining if the information received from the second secondary site disk includes updated heartbeat information.

Figure 3:
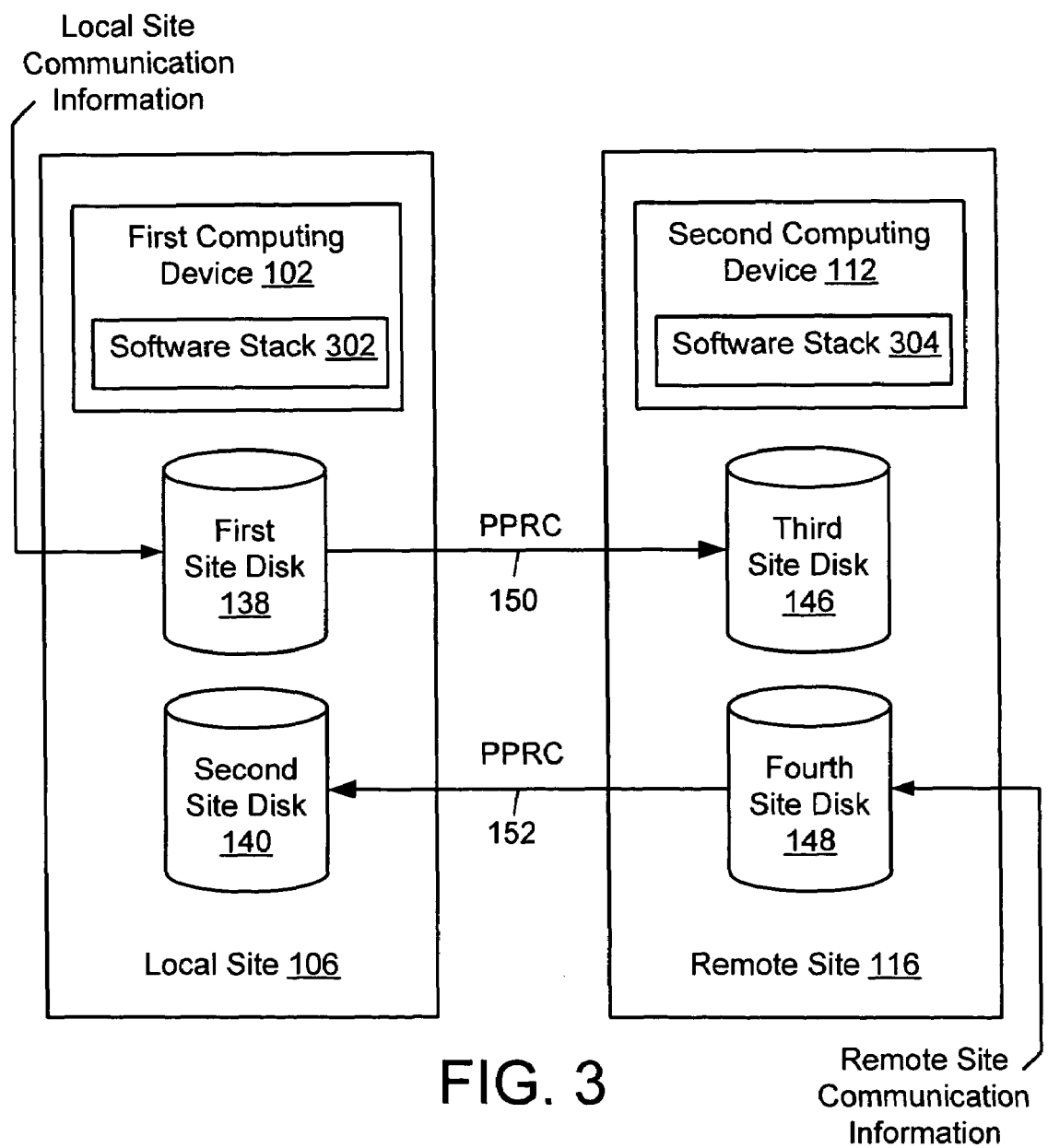
FIG. 3 is a block diagram showing geographically dispersed site disks in accordance with an example of the invention.

For ease of explanation, but without any intended limitation, exemplary method aspects of the present invention are described with reference to the computing system 100 described above and shown in FIG. 1. Additionally, FIG. 3, which is a block diagram showing geographically dispersed site disks in accordance with an example of the invention, may also facilitate understanding the method aspect of the invention. FIG. 3 illustrates that local site communication information from the first computing device 102 is stored on the first site disk 138 (which, more generally may be any suitable storage device and may be called a first site storage device) at the local site 106, and is transmitted across the PPRC communications link 150 to the third site disk 146 (which, more generally may be any suitable storage device and may be called a third site storage device) at the remote site 116. Similarly, FIG. 3 illustrates that remote site communication information from the second computing device 112 is stored on the fourth site disk 148 (which, more generally may be any suitable storage device and may be called a fourth site storage device) at the remote site 116, and is transmitted across the PPRC communications link 152 to the second site disk 140 (which, more generally may be any suitable storage device and may be called a second site storage device) at the local site 106. Software stack 302 in the first computing device 102, and software stack 304 in the second computing device 112, may comprise software for implementing examples of the invention.

An example of the method aspects of the present invention is illustrated in FIGS. 4A, 4B, 4C, and 4D which show a sequence 400 for a method for communicating in a computing system. Instructions for carrying out many of the operations of the sequence 400 may be included in a custom TCP/IP socket library and/or in an application. To implement some examples of the invention, the custom TCP/IP socket library may replace a standard TCP/IP socket library, or may be provided in addition to a standard TCP/IP socket library. Standard TCP/IP socket libraries are available for example, for Java, Unix, and Windows. Although the custom TCP/IP socket library is called "custom", the custom TCP/IP socket library may be mass produced like a standard TCP/IP socket library. In alternative embodiments, the sockets and socket library could be implemented for communications protocols other than TCP/IP (Transmission Control Protocol/Internet Protocol), for example UDP (User Datagram Protocol). More generally, examples of the invention could be used with other communication protocols, for example, IPv6, ATM, and NetBIOS.

Figure 4A:
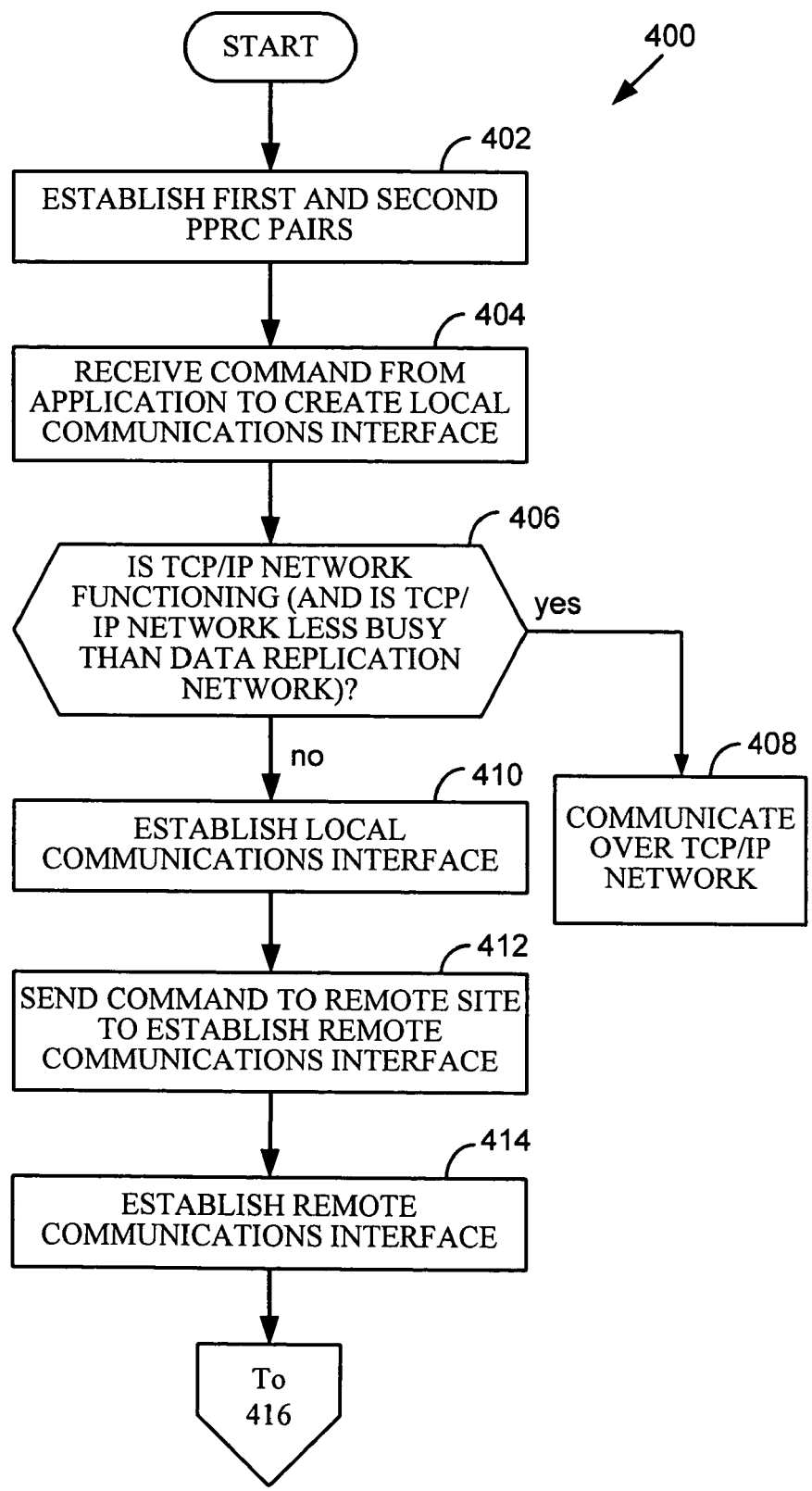
FIGS. 4A, 4B, 4C, and 4D are a flowchart of an operational sequence for communicating in a computing system in accordance with an example of the invention.

Referring to FIG. 4A, the sequence 400 may include, and begin with, operation 402, which comprises establishing first and second PPRC pairs using a Read From Secondary option, wherein the first PPRC pair comprises the first site disk 138 and the third site disk 146, and the second PPRC pair comprises the fourth site disk 148 and the second site disk 140. In some examples of the invention, operation 400 comprises establishing only the first PPRC pair or the second PPRC pair. PPRC may be referred to as a remote data replication protocol or technology. PPRC uses unidirectional private communication links 150, 152 that may be implemented using Fibre Channel technology. Other examples of the invention may be implemented with bidirectional communications link(s) rather than unidirectional communication links. Using two of these links 150, 152, one in each direction, the PPRC pairs can be created, with the primary of the first pair at the local site 106 and the secondary of the first pair at the remote site 116, and with the primary of the second pair at the remote site 116 and the secondary of the second pair at the local site 106. Establishing a PPRC pair may comprise making an initial copy of the information that is stored on the primary site disk, onto the secondary site disk, and then entering a duplexed state wherein there is replication of all update activity. In alternative examples, the site disks 138, 140, 146, 148 could be managed by remote mirroring technologies other than PPRC.

Sequence 400 may also include operation 404, which comprises receiving a command from an application, to create a local communications interface. In some examples, the command from the application may be a command to open a TCP/IP socket. In other examples, the command may be a command to open another type of socket. The sequence 400 may also include operation 406, which comprises determining if a TCP/IP network is functioning (and in some embodiments, also includes determining if the TCP/IP network is less busy than the data replication network). For example, operation 406 may comprise determining if primary communications link 154 and/or backup communications link 164 is functioning. If in operation 406 it is determined that a TCP/IP network is functioning, then the sequence 400 may include operation 408, which comprises communicating, between a local site and a remote site, using a functioning TCP/IP network.

If in operation 406 it is determined that a TCP/IP network is not functioning, then TCP/IP communications may be conducted over data replication PPRC links 150 and 152. In alternative examples, TCP/IP communications may be conducted over the data replication PPRC links 150 and 152 even when a TCP/IP network is functioning, for example, for load balancing, if the data replication network is less busy than a TCP/IP network that could be used. Thus, in some alternative examples, an application may automatically use whichever network (the TCP/IP network or the data replication network) is less busy for TCP/IP communications.

If in operation 406 it is determined that a TCP/IP network is not functioning (or in alternative embodiments, if the data replication network is less busy than the TCP/IP network(s)), then the sequence 400 may continue with operation 410, which comprises establishing the local communications interface at the local site 106. As an example, the local communications interface may be a first TCP/IP socket, and operation 410 may comprise opening the TCP/IP socket.

Sequence 400 may also include operation 412, which comprises sending a command from the local site 106 to the remote site 116, wherein the command is a command to the remote site 116 (for example a command to the second computing device 112 at the remote site 116) to establish the remote communications interface at the remote site 116. The remote site 116 (for example the second computing device 112 at the remote site 116) may send an acknowledgment back to the local site 106 (for example to the first computing device 102 at the local site 106), to let the local site 106 know that the command (which may also be referred to as a call) was received successfully. As an example, the remote communications interface at the remote site 116 may be a second TCP/IP socket. The sequence 400 may also include operation 414, which comprises establishing the remote communications interface at the remote site 116. As an example, the remote communications interface may be a second TCP/IP socket. After the remote communications interface at the remote site 116 is established, the communications interface (which may be a socket) may be monitored by the second computing device 112 at the remote site 116 to identify when communications are received at the remote communications interface. In some examples the first TCP/IP socket and the second TCP/IP socket may be members of a simulated TCP/IP socket library. The simulated socket library facilitates communications over the remote copy communications links 150, 152, such that, to applications that send and receive data, the communications appear to be over an Ethernet network or another traditional TCP/IP network such as modem, token ring, or wireless, rather than over the data replication communications links 150, 152.

Figure 4B:
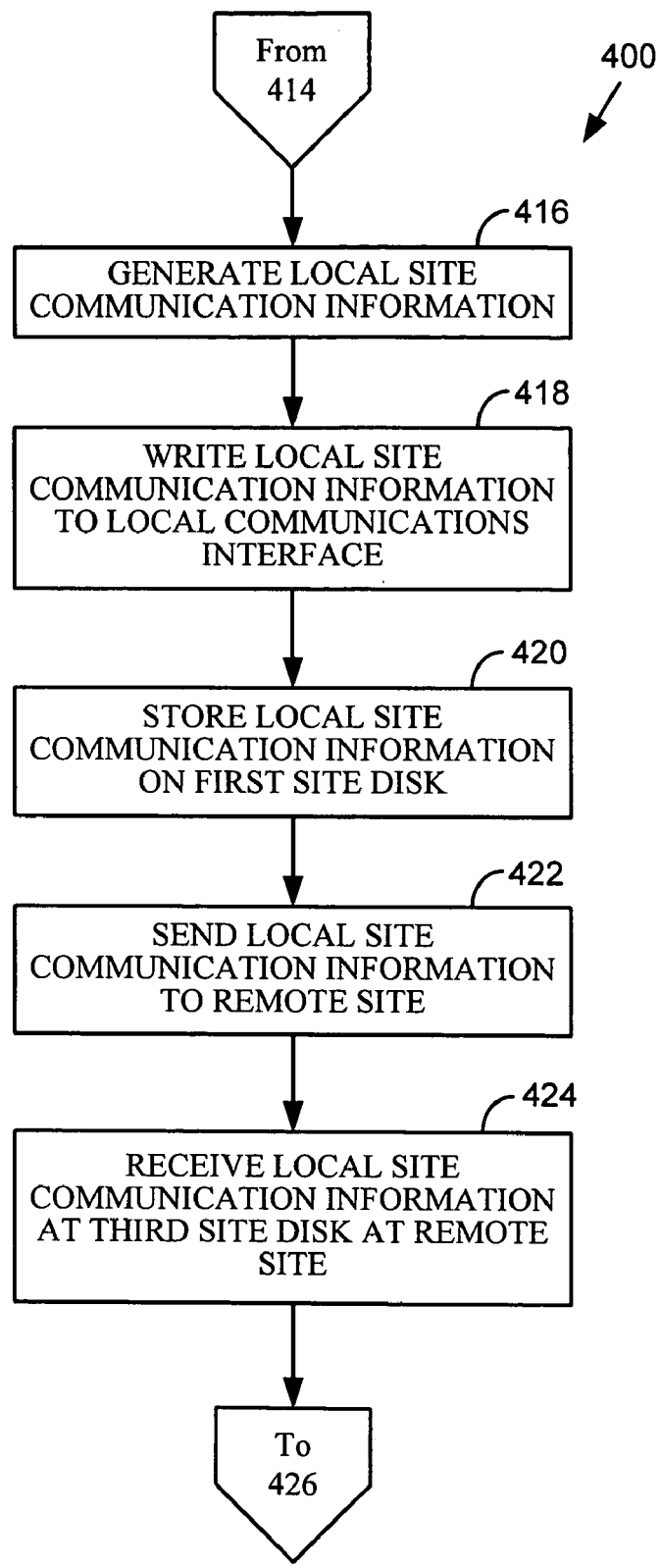

Referring to FIG. 4B, sequence 400 may also include operation 416, which comprises generating local site communication information at the local site 106. As an example, the local site communication information may be generated by an application running on the first computing device 102. The local site communication information may be, for example, a command or data. The sequence 400 may also include operation 418, which comprises writing local site communication information to the local communications interface. As an example, an application program may write the local site communication information to the local communications interface. Operations 420 and 422, discussed next, may be considered to be included in operation 418. Sequence 400 may also include operation 420, which comprises storing the local site communication information on the first site disk 138 at the local site 106. Sequence 400 may also include operation 422, which comprises sending (which includes attempting to send) the local site communication information from the first site disk 138 at the local site 106, to the third site disk 146 at the remote site 116. As an example, operation 422 may comprise sending the local site communication information over a first remote copy communications link. As a further example, the first remote copy communications link may be the first PPRC communications link 150, and in some examples PPRC may be used to perform the sending operation. Sequence 400 may also include operation 424, which comprises receiving the local site communication information at the third site disk 146 at the remote site 116.

Native error checking methods of PPRC may be used. For example, if the local site communication information is not replicated from the first site disk 138 to the third site disk 146, PPRC returns an I/O error. If an I/O error is received at the local site 106, the state of the mirror may be investigated to determine if the I/O should be retried or not.

Figure 4C:
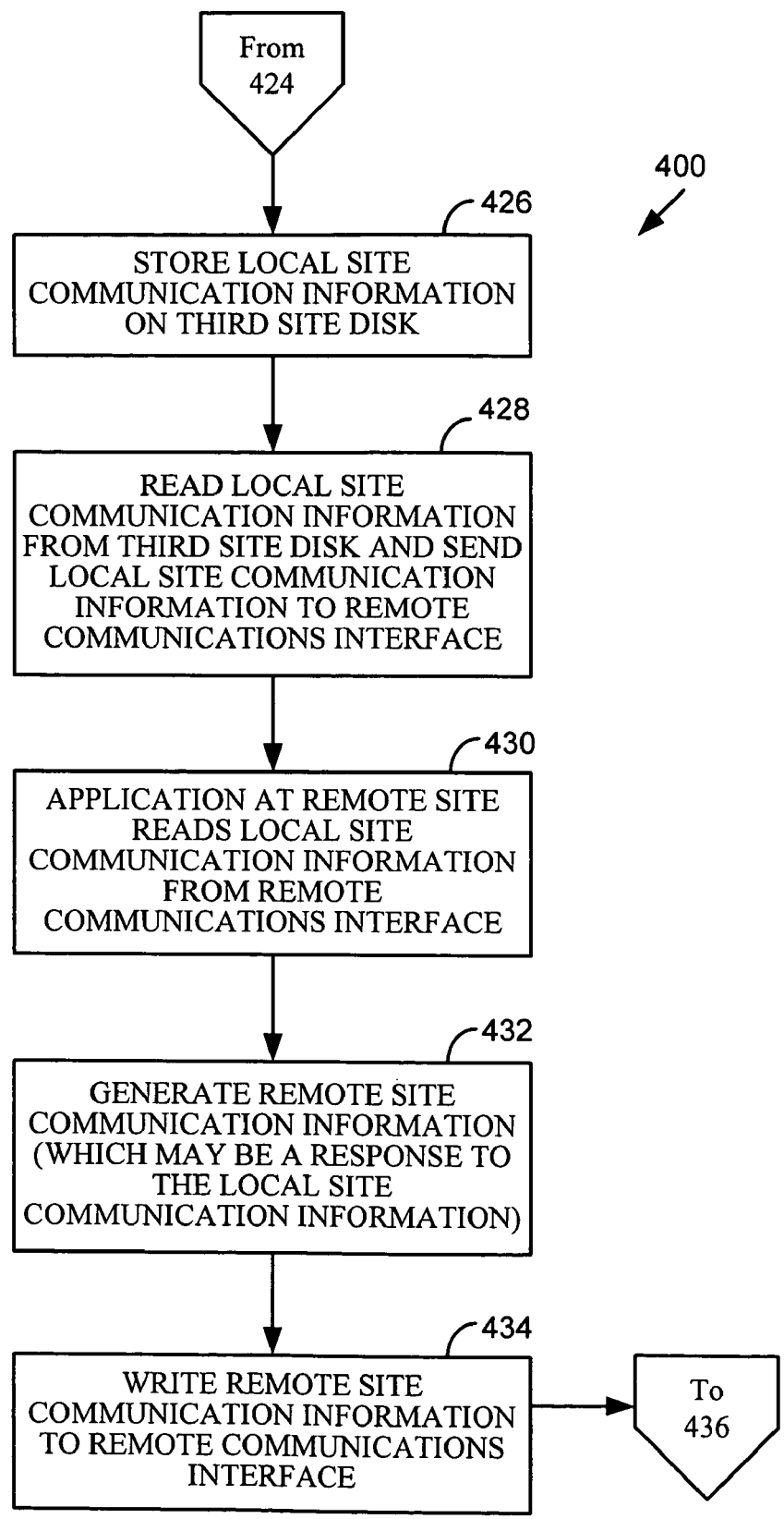

Referring to FIG. 4C, sequence 400 may also include operation 426, which comprises storing the local site communication information on the third site disk 146 at the remote site 116. Sequence 400 may also include operation 428, which comprises reading the local site communication information from the third site disk 146 at the remote site 116, and sending the local site communication information to the remote communications interface, where the local site communication information is then received. Sequence 400 may also include operation 430, which comprises having an application at the remote site read the local site communication information from the remote communications interface.

Sequence 400 may also include operation 432, which comprises generating the remote site communication information at the remote site 116. As an example, the remote site communication information may be generated by an application running on the second computing device 112, and may be a response to the local site communication information. The remote site communication information may be, for example, a command or data or an acknowledgment. Sequence 400 may also include operation 434, which comprises writing the remote site communication information to the remote communications interface. Operations 436 and 438, discussed next, may be considered to be part of operation 434.

Figure 4D:
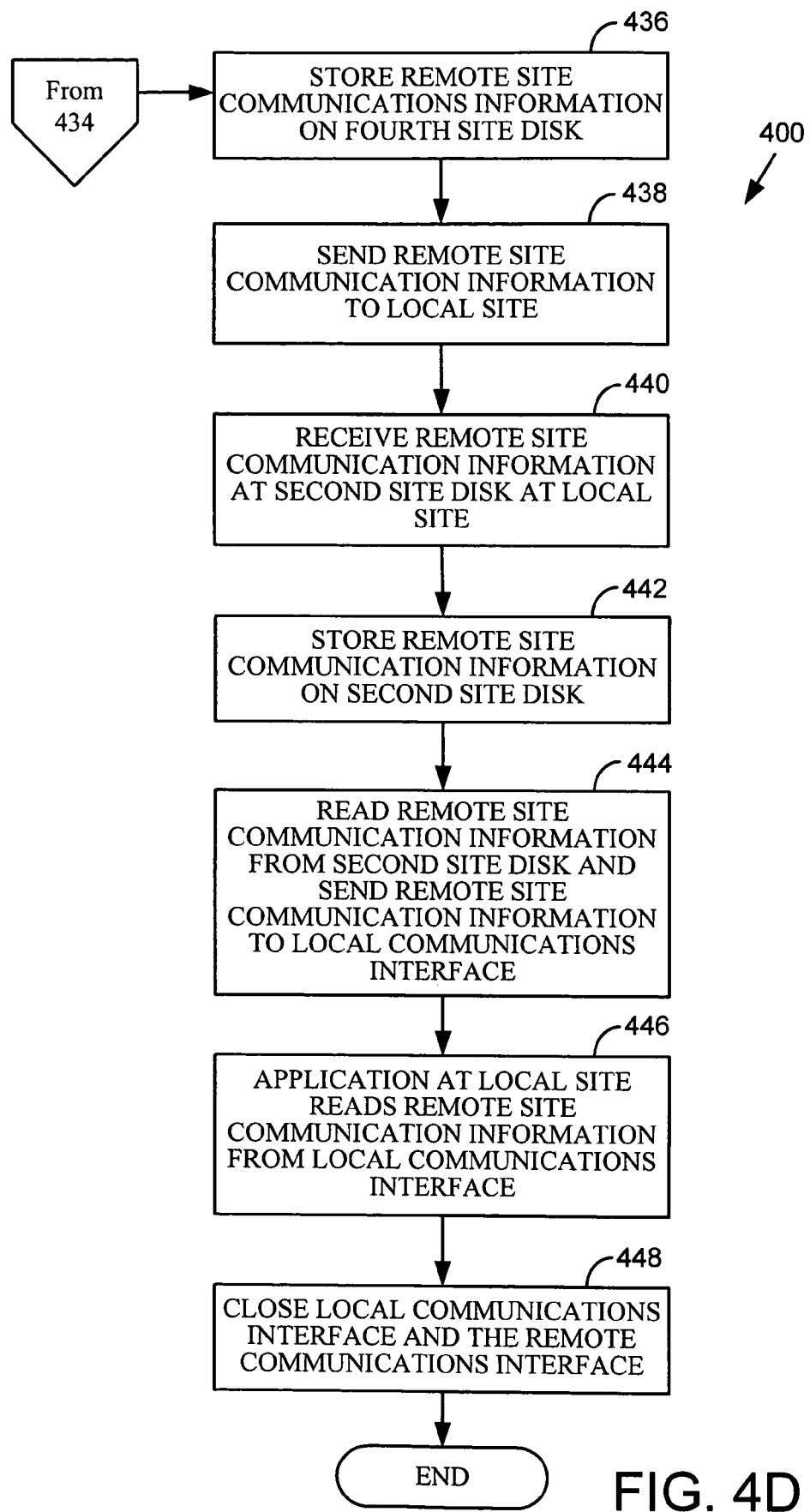

Referring to FIG. 4D, sequence 400 may also include operation 436, which comprises storing the remote site communication information on the fourth site disk 148 at the remote site 116. Sequence 400 may also include operation 438, which comprises sending (which includes attempting to send) the remote site communication information from the fourth site disk 148 at the remote site 116, to the second site disk 140 at the local site 106. As an example, operation 438 may comprise sending the remote site communication information over a second data replication communications link. As a further example, the second data replication communications link may be the second PPRC communications link 152, and in some examples PPRC may be used to perform the sending operation. In some alternative examples, a bidirectional remote copy technology could be used, and a bidirectional data replication communications link could be used both for sending local site communication information from the local site 106 to the remote site 116, and for sending remote site communication information from the remote site 116 to the local site 106. As an example, the communication information may be an acknowledgement of receipt of a command to open a socket, or may be data. Sequence 400 may also include operation 440, which comprises receiving the remote site communication information at the second site disk 140 at the local site 106.

In an alternative embodiment, rather than using separate site disks 138 and 140 at the local site 106, a single disk could be used wherein writes and reads are made to separate byte ranges on the single disk at the local site 106. Similarly, a single site disk could be used at the remote site 116 in place of the two site disks 146, 148. Thus, examples of the invention may write and read to separate byte ranges on a single disk at the local site 106, which may be mirrored to separate byte ranges on a single disk at the remote site 116. More generally, storage devices other than disks could also be used.

Sequence 400 may also include operation 442, which comprises storing the remote site communication information on the second site disk 140 at the local site 106. Operations 420, 422, 424, 426, 436, 438, 440, and 442 may be performed by the remote data replication technology. Sequence 400 may also include operation 444, which comprises reading the remote site communication information from the second site disk 140 at the local site 106, and sending the remote site communication information to the local communications interface, where the remote site communication information is then received. The process of writing or reading the site disks can use multiple paths to the storage volume, in order to eliminate single points of failure. Sequence 400 may also include operation 446, which comprises having an application at the local site 106 read the remote site communication information from the local communications interface. The second site disk 140 can be read by a socket library (for example a TCP/IP socket library), and the third site disk 146 can be read by a socket library (for example a TCP/IP socket library), while a remote copy operation is active.

The sequence 400 may also include operation 448, which comprises closing the local communications interface and the remote communications interface, which in some examples may comprise closing the first TCP/IP socket and the second TCP/IP socket.

Generally, some examples of the invention may be called two-way network communications using remotely mirrored disks. Further, some examples of the method aspect of the invention may be called a method for performing two way network communications using remote mirroring technology. Some examples of the invention may be summarized as follows. A programmer or application at a site A creates a socket for communicating with a site B, and writes data to that socket, and then closes the socket when the communications are completed. A custom socket library is used at site A, which provides TCP/IP (or other protocols) services such as in-order delivery and acknowledgments, and two mirrored disk pairs are utilized to communicate with a socket at site B created with a similar custom socket library at site B. To applications and users, the custom socket library appears to be a standard socket library. Once the custom socket library is implemented, a storage area network can be used for IP communications, and the storage area network can act as a backup network for a wide area network, such as a company intranet. Thus, a backup IP network need not be provided, and accordingly, networking costs can be significantly reduced. Similarly, using currently available technology, an IP network could be used as a backup for a storage area network.

The following is a representation of data flow during implementation of an example of the invention: Application->Socket Library->Local Storage Volume->Remote Copy Technology->Remote Storage Volume->Socket Library->Application. This representation may be described as follows: An application (for example, a database, email client, or web browser) sends data, to a custom socket library, and the data is stored on a local storage volume, all which are at a first site, and then the data is transmitted using PPRC mirroring to a second site, and the data is stored on a remote storage volume at the second site, and the data is sent to a custom socket library at the second site, and lastly, the data is sent to an application at the second site.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for conducting IP communications over a SAN, to simulate TCP/IP communications over an Ethernet network, by performing communications between a first PPRC pair and communications between a second PPRC pair, the method comprising the following operations:
   establishing a first PPRC pair comprising a first site disk at a local site and a third site disk at a remote site, wherein the first site disk and the third site disk are coupled to a first unidirectional private communication link which provides communications between the local site and the remote site;
   establishing a second PPRC pair comprising a fourth site disk at the remote site and a second site disk at the local site, wherein the fourth site disk and the second site disk are coupled to a second unidirectional private communication link which provides communications between the remote site and the local site;

determining if a TCP/IP network is functioning;

and if a determination is made that the TCP/IP network is functioning, conducting IP communications over the TCP/IP network;

and performing the following additional operations only if a determination is made that the TCP/IP network is not functioning:

opening a first TCP/IP socket at the local site;

opening a second TCP/IP socket at the remote site;

wherein the first TCP/IP socket and the second TCP/IP socket are members of a simulated TCP/IP socket library simulating TCP/IP communications over an Ethernet network, wherein the TCP/IP communications over the Ethernet network are simulated with communications between the first PPRC pair over the first unidirectional private communication link, and with communications between the second PPRC pair over the second unidirectional private communication link;

generating local site communication information;

writing the local site communication information to the first TCP/IP socket at the local site, wherein writing the local site communication information to the first TCP/IP socket at the local site comprises storing the local site communication information on the first site disk at the local site and using PPRC to send the local site communication information from the first site disk at the local site over the first unidirectional private communications link to the third site disk at the remote site;

storing the local site communication information at the third site disk at the remote site;

reading the local site communication information from the third site disk at the remote site;

sending the local site communication information read from the third site disk, to the second TCP/IP socket; and reading the local site communication information from the second TCP/IP socket, wherein the local site communication information is read by an application at the remote site.

2. The method of claim 1, wherein the operations further comprise:

generating remote site communication information;

writing the remote site communication information to the second TCP/IP socket at the remote site, wherein writing the remote site communication information to the second TCP/IP socket at the remote site comprises storing the remote site communication information on the fourth site disk at the remote site and using PPRC to send the remote site communication information from the fourth site disk at the remote site over the second unidirectional private communications link to the second site disk at the local site;

storing the remote site communication information at the second site disk at the local site;

reading the remote site communication information from the second site disk at the local site;

sending the remote site communication information read from the second site disk, to the first TCP/IP socket; and reading the remote site communication information from the first TCP/IP socket, wherein the remote site communication information is read by an application at the local site.

3. The method of claim 2, wherein the operation of reading the remote site communication information from the second site disk is performed while a remote copy operation is active.

4. The method of claim 3, wherein the operations further comprise:

making an initial copy of information stored on the first site disk, onto the third site disk, and then replicating all update activity that occurs on the first site disk, onto the third site disk; and making an initial copy of information stored on the fourth site disk, onto the second site disk, and then replicating all update activity that occurs on the fourth site disk, onto the second site disk.

5. The method of claim 4, wherein the local site communication information is generated by an application at the local site.

6. The method of claim 5, wherein the operations further comprise closing the first TCP/IP socket and the second TCP/IP socket.

7. The method of claim 6, wherein the operations further comprise sending a command from the local site to the remote site, wherein the command is to open the second TCP/IP socket at the remote site.

8. The method of claim 7, wherein the first unidirectional private communication link and the second unidirectional private communication link are Fibre Channel links.

9. The method of claim 8, wherein the local site and the remote site are separated by a distance of more than 103 kilometers.

10. The method of claim 7, wherein the local site communication information is an acknowledgement.

11. The method of claim 7, wherein the local site communication information is a command.

12. The method of claim 7, wherein the local site communication information is data.

13. A method for conducting IP communications over a SAN, to simulate TCP/IP communications over an Ethernet network, by performing unidirectional communications between a first PPRC pair and unidirectional communications between a second PPRC pair, the method comprising the following operations:

establishing a first PPRC pair comprising a first site disk at a local site and a third site disk at a remote site, wherein the first site disk and the third site disk are coupled to a first unidirectional private communication link which provides communications in a direction from the local site to the remote site;

establishing a second PPRC pair comprising a fourth site disk at the remote site and a second site disk at the local site, wherein the fourth site disk and the second site disk are coupled to a second unidirectional private communication link which provides communications in a direction from the remote site to the local site;

determining if a TCP/IP network has a heaver load than a data replication network comprising the first and second PPRC pairs;

and if a determination is made that the TCP/IP network does not have a heavier load, conducting IP communications over the TCP/IP network;

and performing the following additional operations only if a determination is made that the TCP/IP network has a heavier load:

opening a first TCP/IP socket at the local site;

opening a second TCP/IP socket at the remote site;

wherein the first TCP/IP socket and the second TCP/IP socket are members of a simulated TCP/IP socket library simulating TCP/IP communications over an Ethernet network, wherein the TCP/IP communications over the Ethernet network are simulated with communications between the first PPRC pair over the first unidirectional private communication link, and with communications between the second PPRC pair over the second unidirectional private communication link;

generating local site communication information;

writing the local site communication information to the first TCP/IP socket at the local site, wherein writing the local site communication information to the first TCP/IP socket at the local site comprises storing the local site communication information on the first site disk at the local site and using PPRC to send the local site communication information from the first site disk at the local site over the first unidirectional private communications link to the third site disk at the remote site;

storing the local site communication information at the third site disk at the remote site;

reading the local site communication information from the third site disk at the remote site;

sending the local site communication information read from the third site disk, to the second TCP/IP socket;

reading the local site communication information from the second TCP/IP socket, wherein the local site communication information is read by an application at the remote site;

generating remote site communication information;

writing the remote site communication information to the second TCP/IP socket at the remote site, wherein writing the remote site communication information to the second TCP/IP socket at the remote site comprises storing the remote site communication information on the fourth site disk at the remote site and using PPRC to send the remote site communication information from the fourth site disk at the remote site over the second unidirectional private communications link to the second site disk at the local site;

storing the remote site communication information at the second site disk at the local site;

reading the remote site communication information from the second site disk at the local site;

sending the remote site communication information read from the second site disk, to the first TCP/IP socket; and reading the remote site communication information from the first TCP/IP socket, wherein the remote site communication information is read by an application at the local site.

14. A method for conducting TCP/IP communications over a SAN, by performing communications between a first PPRC pair and communications between a second PPRC pair, the method comprising the following operations:

establishing a first PPRC pair comprising a first site disk at a local site and a third site disk at a remote site, wherein the first site disk and the third site disk are coupled to a first unidirectional private communication link which provides communications in a direction from the local site to the remote site;

establishing a second PPRC pair comprising a fourth site disk at the remote site and a second site disk at the local site, wherein the fourth site disk and the second site disk are coupled to a second unidirectional private communication link which provides communications in a direction from the remote site to the local site;

determining if a TCP/IP network is functioning;

and if a determination is made that the TCP/IP network is functioning, conducting IP communications over the TCP/IP network;

and performing the following additional operations only if a determination is made that the TCP/IP network is not functioning:

opening a first TCP/IP socket at the local site;

opening a second TCP/IP socket at the remote site;

wherein the first TCP/IP socket and the second TCP/IP socket are members of a simulated TCP/IP socket library simulating TCP/IP communications over a token ring network, wherein the TCP/IP communications over the token ring network are simulated with communications between the first PPRC pair over the first unidirectional private communication link, and with communications between the second PPRC pair over the second unidirectional private communication link;

generating local site communication information;

writing the local site communication information to the first TCP/IP socket at the local site, wherein writing the local site communication information to the first TCP/IP socket at the local site comprises storing the local site communication information on the first site disk at the local site and using PPRC to send the local site communication information from the first site disk at the local site over the first unidirectional private communications link to the third site disk at the remote site;

storing the local site communication information at the third site disk at the remote site;

reading the local site communication information from the third site disk at the remote site;

sending the local site communication information read from the third site disk, to the second TCP/IP socket;

reading the local site communication information from the second TCP/IP socket, wherein the local site communication information is read by an application at the remote site;

generating remote site communication information;

writing the remote site communication information to the second TCP/IP socket at the remote site, wherein writing the remote site communication information to the second TCP/IP socket at the remote site comprises storing the remote site communication information on the fourth site disk at the remote site and using PPRC to send the remote site communication information from the fourth site disk at the remote site over the second unidirectional private communications link to the second site disk at the local site;

storing the remote site communication information at the second site disk at the local site;

reading the remote site communication information from the second site disk at the local site;

sending the remote site communication information read from the second site disk, to the first TCP/IP socket; and reading the remote site communication information from the first TCP/IP socket, wherein the remote site communication information is read by an application at the local site.

* * * * *